(12) United States Patent
Beach et al.

(10) Patent No.: US 6,451,989 B1
(45) Date of Patent: *Sep. 17, 2002

(54) BLACK AZO DYES

(75) Inventors: Bradley Leonard Beach; Ann P Holloway, both of Lexington, KY (US); James F Feeman, Wyomissing, PA (US)

(73) Assignee: Lexmark International, Inc., Lexington, KY (US)

( * ) Notice: Subject to any disclaimer, the term of this patent is extended or adjusted under 35 U.S.C. 154(b) by 30 days.

This patent is subject to a terminal disclaimer.

(21) Appl. No.: 09/883,904

(22) Filed: Jun. 18, 2001

Related U.S. Application Data

(63) Continuation of application No. 09/642,136, filed on Aug. 18, 2000, now Pat. No. 6,288,217.

(51) Int. Cl.⁷ .......................... C09B 31/08; C09B 33/22; C09D 11/02
(52) U.S. Cl. .................. 534/728; 534/810; 534/815; 534/829; 534/836; 106/31.52
(58) Field of Search ................................. 534/810, 815, 534/829, 836, 728; 106/31.52

(56) References Cited

U.S. PATENT DOCUMENTS

| | | | | |
|---|---|---|---|---|
| 4,765,838 A | * | 8/1988 | Ohata et al. | 106/22 |
| 5,198,022 A | | 3/1993 | Aulick et al. | |
| 5,213,614 A | * | 5/1993 | Eida et al. | 106/22 K |
| 5,437,716 A | * | 8/1995 | Sano et al. | 106/22 K |
| 5,453,495 A | | 9/1995 | Gregory et al. | |
| 5,478,384 A | * | 12/1995 | Takimoto et al. | |
| 5,480,478 A | | 1/1996 | Sano et al. | |
| 5,667,571 A | | 9/1997 | Ono et al. | |
| 5,725,644 A | | 3/1998 | Sano et al. | |
| 5,753,016 A | | 5/1998 | Hayashi et al. | |
| 5,756,693 A | | 5/1998 | Kenyon et al. | |
| 5,795,970 A | | 8/1998 | Ono et al. | |
| 5,843,218 A | | 12/1998 | Gregory et al. | |
| 5,882,391 A | | 3/1999 | Gregory et al. | |
| 5,882,392 A | | 3/1999 | Gregory et al. | |
| 5,888,286 A | | 3/1999 | Gregory et al. | |
| 5,891,230 A | | 4/1999 | Gregory et al. | |
| 6,288,217 B1 | * | 9/2001 | Beach et al. | 534/728 |

FOREIGN PATENT DOCUMENTS

| | | | |
|---|---|---|---|
| JP | 5-179181 | * | 7/1993 |
| JP | 6-220377 | * | 8/1994 |
| JP | 7-268255 | * | 10/1995 |
| JP | 7-331145 | * | 12/1995 |
| JP | 60-243157 | * | 12/1995 |
| JP | 10-298471 | * | 11/1998 |

OTHER PUBLICATIONS

Sano et al., Chemical Abstracts, 130:39895, 1998.*

* cited by examiner

Primary Examiner—Fiona T. Powers

(57) ABSTRACT

Provided are novel black azo dyes which are useful in ink compositions, especially ink jet ink compositions. The dyes and ink compositions of the present invention exhibit a good balance of optical density, print reliability, water fastness and light fastness.

10 Claims, No Drawings

BLACK AZO DYES

REFERENCE TO RELATED APPLICATIONS

This is a continuation application of Ser. No. 09/642,136, filed Aug. 18, 2000, now U.S. Pat. No. 6,288,217, which is hereby incorporated herein by reference.

FIELD OF THE INVENTION

This invention belongs to the field of organic chemistry. In particular, it relates to certain azo dyes useful in ink jet ink compositions.

BACKGROUND OF THE INVENTION

Inks used in ink jet printing systems typically are comprised of various dyes either dissolved in water or an organic solvent or mixtures thereof. There is a need for inks having higher quality images, printing speed, improved waterfastness and lightfastness.

U.S. Pat. No. 5,198,022 describes certain alkali-soluble azo dyes for waterfast ink compositions.

U.S. Pat. No. 5,667,571 describes certain non-pollutive ink compositions using alcohol or glycol ether as solvent, which can be used as writing ink, (industrial) ink jet printing ink, stamp ink, etc. Certain triazinylamino substituted disazo dyes are described.

U.S. Pat. No. 5,795,970 describes certain disazo dyes useful in ink compositions which claims to provide sharp printing images having high optical density and no bleeding which also result in rapid fixing of the ink, water resistance and light resistance, even when printed on plain paper.

U.S. Pat. No. 5,753,016 describes certain disazo dyes which are useful in ink compositions and claim to offer a combination of a high-quality image with a waterfast printing image.

U.S. Pat. No. 5,453,495 describes certain piperazinyl substituted disazo dyes which are useful in ink jet compositions.

U.S. Pat. No. 5,891,230 describes certain disazo dyes useful in ink jet printing. Further examples of disazo dyes can be found in the following: U.S. Pat. Nos. 5,725,644; 5,480,478; 5,888,286; 5,882,392; 5,843,218; and 5,756,693.

SUMMARY OF THE INVENTION

Provided are novel black azo dyes which are useful in ink compositions, especially ink jet ink compositions. The dyes and ink compositions of the present invention exhibit a good balance of optical density, color value, water fastness and light fastness. Especially preferred dyes have the following structural formula:

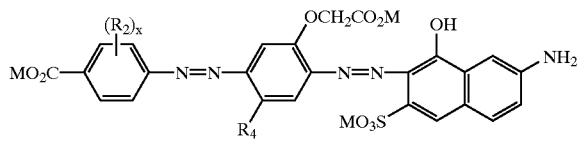

(III)

wherein:
$R_2$, $R_4$, x and M are as defined herein.

DETAILED DESCRIPTION OF THE INVENTION

In a first embodiment, the present invention provides a compound of Formula (I):

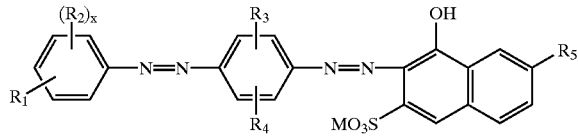

(I)

wherein:
$R_1$ is —O—$(CH_2)_m$—$CO_2M$, —$(CH_2)_n$—$CO_2M$, —$CO_2M$, or —$SO_3M$;

$R_2$ is —H, —$CO_2M$, -lower alkyl, -lower alkoxy, nitro; —$CF_3$, halogen, —NHCO-lower alkyl, —O—$(CH_2)_m$—$CO_2M$, or —$(CH_2)_n$—$CO_2M$;

$R_3$ is -lower-alkyl, —O—$(CH_2)_m$—$CO_2M$, —$(CH_2)_n$—$CO_2M$, —NHCO-lower-alkyl; —NHC(O)O-lower-alkyl; or —NH—CO—$CO_2M$;

$R_4$ is -lower-alkyl, -lower alkoxy, —O—$(CH_2)_m$—$CO_2M$, —$(CH_2)_n$—$CO_2M$, —NHCO-lower-alkyl; —NHC(O)O-lower-alkyl; or —NHCOCO$_2$M;

$R_5$ is —N—($R_6$)($R_7$), or a group of the formula

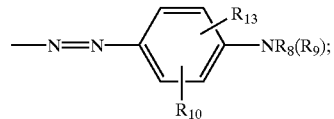

$R_6$ is —H, -lower-alkyl, —$(CH_2)_n$—$CO_2M$, -lower-hydroxyalkyl, or -lower-cyanoalkyl;

$R_7$ is —H, -lower-alkyl, —$(CH_2)_n$—$CO_2M$, -lower-hydroxyalkyl; or -lower-cyanoalkyl;

$R_8$ is —H, -lower-alkyl, -lower-hydroxyalkyl, or —$(CH_2)_n$ $CO_2M$;

$R_9$ is —H, -lower-alkyl, -lower-hydroxyalkyl, or —$(CH_2)_n$ $CO_2M$;

$R_{10}$ is —H, -lower-alkyl, -lower alkoxy, -lower-hydroxyalkyl, —$(CH_2)_n$—$CO_2M$, -halogen; —$NR_8R_9$; —$(CH_2)_n SO_3M$; or —O—$(CH_2)_m CO_2M$;

m is 1,2, or 3;

n is 1,2, or 3;

M is —H, —Li, Na, —K, or —N—$(R_{11})_4$;

$R_{11}$ is —H, -lower alkyl, or —$(CH_2$—$CH(R_{12})$—O$)_p$—H;

p is 1 to 4;

x is 1 or 2;

$R_{12}$ is —H, —$CH_3$, —$CH_2$—$CH_3$, or —$CH_2$—OH; and $R_{13}$ is —H, lower alkyl, lower alkoxy, halogen, —$CO_2M$, or —$SO_3M$.

In a further preferred embodiment, there is provided a compound of Formula (II):

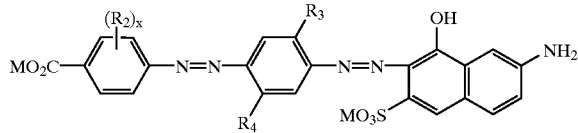

(II)

wherein:
$R_2$ is —H, -lower-alkyl, -lower-alkoxy, —$CO_2M$, —$CF_3$, —$NO_2$, -halogen, —NHCO-lower-alkyl, —O—$(CH_2)_m$—$CO_2M$, or —$(CH_2)_n$—$CO_2M$;

$R_3$ is -lower-alkyl, —O—$(CH_2)_m$—$CO_2M$, —$(CH_2)_n$—$CO_2M$, —NHCO-lower-alkyl, —NHC(O)O-Iower-alkyl, or —$NHCOCO_2M$;

$R_4$ is -lower-alkyl, -lower alkoxy, —O—$(CH_2)_m$—$CO_2M$, —$(CH_2)_n$—$CO_2M$, —NHCO-lower-alkyl, —NHC(O)O-lower-alkyl, or —$NHCOCO_2M$;

m is 1,2, or 3;

n is 1,2, or 3;

M is —H, —Li, Na, —K, or —N—$(R_{11})_4$;

$R_{11}$ is —H, -lower alkyl, or —$(CH_2$—$CH(R_{12})$—$O)_p$—H;

p is 1 to 4;

x is 1 or 2; and $R_{12}$ is —H, —$CH_3$, —$CH_2$—$CH_3$, or —$CH_2$—OH.

In a further preferred embodiment, there is provided a compound of Formula (II):

(III)

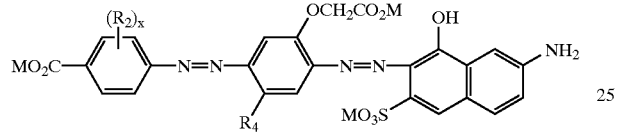

wherein:

$R_2$, $R_4$, x, and M are as defined above. In an especially preferred embodiment, $R_2$ is H and $R_4$ is methoxy.

In the above formulae, it is further preferred that $R_2$ is —H, and that $R_5$, $R_6$, and $R_7$ are each —H. Further examples of preferred compounds include the following:

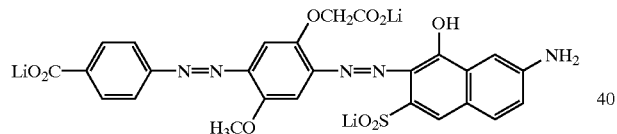

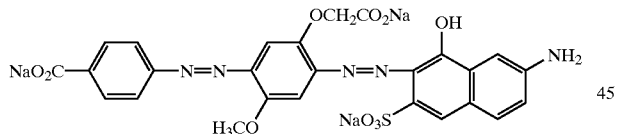

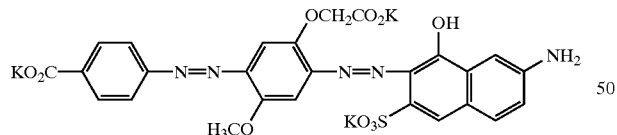

and

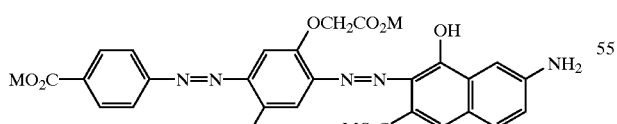

wherein M is —N—$(R_{11})_4$ and $R_{11}$ is —H, or lower alkyl, optionally substituted by hydroxy. Especially preferred groups M include —$NH_4$, —$N(CH_3)_4$, —$N(CH_2CH_3)_4$, and —$NH(CH_2CH_2OH)_3$ In an especially preferred embodiment, there is provided a compound having the formula:

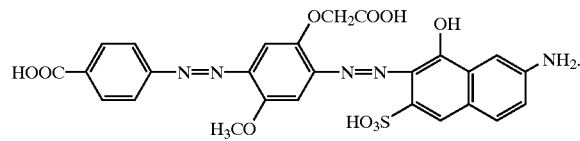

The compounds of the present invention are usefull as dyes, especially as dyes in ink jet ink compositions. Thus, as a further aspect of the invention, there is provided an ink composition comprising:

(a) at least 0.1% by weight of a compound of Formula I:

(I)

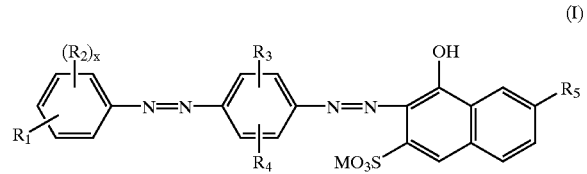

wherein:

$R_1$ is —O—$(CH_2)_m$—$CO_2M$, —$(CH_2)_n$—$CO_2M$, —$CO_2M$, or —$SO_3M$;

$R_2$ is —H, —$CO_2M$, -lower alkyl, -lower alkoxy, nitro; —$CF_3$, halogen, —NHCO-lower alkyl, —O—$(CH_2)_m$—$CO_2M$, or —$(CH_2)_n$—$CO_2M$;

$R_3$ is -lower-alkyl, —O—$(CH_2)_m$—$CO_2M$, —$(CH_2)_n$—$CO_2M$, —NHCO-lower-alkyl; —NHC(O)O-lower-alkyl; or —NH—CO—$CO_2M$;

$R_4$ is -lower-alkyl, -lower alkoxy, O—$(CH_2)_m$—$CO_2M$, —$(CH_2)n$—$CO_2M$, —NHCO-lower-alkyl; —NHC(O)O-lower-alkyl or —$NHCO_2M$;

$R_5$ is —N—$(R_6)(R_7)$, or a group of the formula

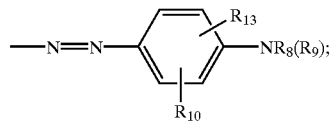

$R_6$ is —H, -lower-alkyl, —$(CH_2)_n$—$CO_2M$, -lower-hydroxyalkyl, or -lower-cyanoalkyl;

$R_7$ is —H, -lower-alkyl, —$(CH_2)_n$—$CO_2M$, -lower-hydroxyalkyl; or -lower-cyanoalkyl;

$R_8$ is —H, lower-alkyl, -lower-hydroxyalkyl, —$(CH_2)_n$ $CO_2M$;

$R_9$ is —H, -lower-alkyl, -lower-hydroxyalkyl, —$(CH_2)_n$ $CO_2M$;

$R_{10}$ is —H, -lower-alkyl, -lower alkoxy, -lower-hydroxyalkyl, —$(CH_2)_n$—$CO_2M$, -halogen; —$NR_8R_9$; —$(CH_2)_nSO_3M$; or —O—$(CH_2)_mCO_2M$;

m is 1,2, or 3;

n is 1,2, or 3;

M is —H, —Li, Na, —K, or —N—$(R_{11})_4$;

$R_{11}$ is —H, -lower alkyl, or —$(CH_2$—$CH(R_{12})$—$O)_p$—H;

p is 1 to 4;

x is 1 or 2;

$R_{12}$ is —H, —$CH_3$, —$CH_2$—$CH_3$, or —$CH_2$—OH; and $R_{13}$ is —H, lower alkyl, lower alkoxy, halogen, —$CO_2M$, or —$SO_3M$;

(b) water, and (c) at least one cosolvent.

The dyes of the present invention, when formulated into inks for drop-on-demand jet printing, exhibit all of the necessary properties for producing waterfast printed characters: (1) they become water-insoluble at acidic pH; (2) they produce intense black characters at 2% and above dye concentration in the ink; (3) they are stable in aqueous ink formulations; and (4) they do not clog the small printhead orifices during non-use, thus providing good printhead maintenance when used for drop-on-demand printing. Preferred inks have at least about 0.5% by weight of the dye and at least by 3, preferably 5–25% by weight of cosolvent.

In the above formula, the term "lower alkyl" preferably refers to a straight or branched-chain $C_1$–$C_4$ alkyl group. Examples include methyl, ethyl, propyl, isopropyl, n-butyl, t-butyl, isobutyl.

The term "lower alkoxy" preferably refers to a $C_1$–$C_4$ alkoxy group. Examples include methoxy, ethoxy, propoxy, butoxy and the like.

Likewise, the terms "lower hydroxyalkyl" and "lower cyanoalkyl" preferably refer to $C_1$–$C_4$ alkyl groups substituted by at least one hydroxy or cyano group, respectively.

The term "lower alkylene" preferably refers to a divalent group of the formula —$(CH_2)$—$_m$ wherein m is an integer of from 1 to 4. Examples include methylene, ethylene, propylene, and butylene.

Examples of especially preferred compounds of Formula (I) include the following wherein $R_1$, $R_2$, $R_3$, $R_4$, $R_5$, and M are set forth in the following table:

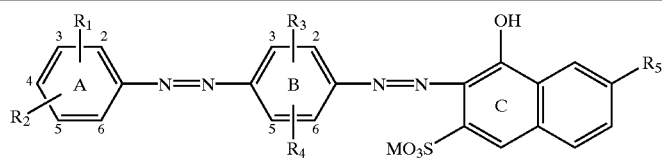

| R1 | R2 | R3 | R4 | R5 | M |
|---|---|---|---|---|---|
| 3-$CO_2$M | —H | 2-$OCH_2CO_2$M | 5-$CH_3$ | $NH_2$ | —H or —$NH_4$ |
| 4-$CO_2$M | —H | 2-$OCH_2CO_2$M | 5-$CH_3$ | $NH_2$ | —H or —$NH_4$ |
| 3-$CO_2$M | —H | 2-$OCH_2CO_2$M | 5-$OCH_3$ | $NH_2$ | —H or —$NH_4$ |
| 4-$CO_2$M | —H | 2-$OCH_2CO_2$M | 5-$OCH_3$ | $NH_2$ | —H or —$NH_4$ |
| 3-$CO_2$M | 5-$CO_2$M | 2-$OCH_2CO_2$M | 5-$CH_3$ | $NH_2$ | —H or —$NH_4$ |
| 3-$CO_2$M | 5-$CO_2$M | 2-$OCH_2CO_2$M | 5-$OCH_3$ | $NH_2$ | —H or —$NH_4$ |
| 3-$CO_2$M | —H | 2-$OCH_2CO_2$M | 5-$OCH_3$ | $NH_2$ | —H or —$NH_4$ |
| 4-$CO_2$M | —H | 2-$CH_2CO_2$M | 5-$OCH_3$ | $NH_2$ | —H or —$NH_4$ |
| 3-$CO_2$M | 6-$CH_3$ | 2-$CH_2CO_2$M | 5-$CH_3$ | $NH_2$ | —H or —$NH_4$ |
| 3-$CO_2$M | 6-$CH_3$ | 2-$OCH_2CO_2$M | 5-$OCH_3$ | $NH_2$ | —H or —$NH_4$ |
| 3-$CO_2$M | 2-$CH_3$ | 2-$OCH_2CO_2$M | 5-$OCH_3$ | $NH_2$ | —H or —$NH_4$ |
| 3-$CO_2$M | 6-Cl | 2-$OCH_2CO_2$M | 5-$OCH_3$ | $NH_2$ | —H or —$NH_4$ |
| 4-$CO_2$M | 2-Cl | 2-$OCH_2CO_2$M | 5-$OCH_3$ | $NH_2$ | —H or —$NH_4$ |
| 3-$CO_2$M | 4-Cl | 2-$OCH_2CO_2$M | 5-$OCH_3$ | $NH_2$ | —H or —$NH_4$ |
| 4-$CO_2$M | 3-OH | 2-$OCH_2CO_2$M | 5-$OCH_3$ | $NH_2$ | —H or —$NH_4$ |
| 2-$CO_2$M | 5-$CO_2$M | 2-$OCH_2CO_2$M | 5-$OCH_3$ | $NH_2$ | —H or —$NH_4$ |
| 4-$CO_2$M | 3-On$C_4H_9$ | 2-$OCH_2CO_2$M | 5-$OCH_3$ | $NH_2$ | —H or —$NH_4$ |
| 2-$CO_2$M | 4F | 2-$OCH_2CO_2$M | 5-$OCH_3$ | $NH_2$ | —H or —$NH_4$ |
| 3-$CO_2$M | 4-$CO_2$M | 2-$OCH_2CO_2$M | 5-$OCH_3$ | $NH_2$ | —H or —$NH_4$ |
| 3-$CO_2$M | 4-OH | 2-$OCH_2CO_2$M | 5-$OCH_3$ | $NH_2$ | —H or —$NH_4$ |
| 2-$CO_2$M | 4-$NO_2$ | 2-$OCH_2CO_2$M | 5-$OCH_3$ | $NH_2$ | —H or —$NH_4$ |
| 2-$CO_2$M | 5-$NO_2$ | 2-$OCH_2CO_2$M | 5-$OCH_3$ | $NH_2$ | —H or —$NH_4$ |
| 5-$CO_2$M | 2-$OCH_3$ | 2-$OCH_2CO_2$M | 5-$OCH_3$ | $NH_2$ | —H or —$NH_4$ |
| 4-$CO_2$M | —H | 2-$OCH_2CO_2$M | 5-$OCH_2CO_2$M | $NH_2$ | —H or —$NH_4$ |
| 4-$CO_2$M | —H | 2-$CH_2CO_2$M | 5-$OCH_2CO_2$M | $NH_2$ | —H or —$NH_4$ |
| 4-$CO_2$M | —H | 2-$OCH_2CO_2$M | 5-$OCH_2CO_2$M | $NH_2$ | —H or —$NH_4$ |
| 2-$CO_2$M | 5-Br | 2-$OCH_2CO_2$M | 5-$OCH_3$ | —$NH_2$ | —H or —$NH_4$ |
| 2-$CO_2$M | 5-$OCH_3$ | 2-$OCH_2CO_2$M | 5-$OCH_3$ | —$NH_2$ | —H or —$NH_4$ |
| 4-$CO_2$M | —H | 2-$OCH_2CH_2CO_2$M | 5-$OCH_3$ | —$NH_2$ | —H or —$NH_4$ |
| 4-$CO_2$M | —H | 2-$OCH_2CO_2$M | 5-$OCH_3$ | —$NH_2$ | —$N(CH_3)_4$ |
| 4-$CO_2$M | —H | 2-$OCH_2CO_2$M | 5-$OCH_3$ | —$NH_2$ | —$N(C_2H_5)_4$ |
| 4-$CO_2$M | —H | 2-$OCH_2CO_2$M | 5-$OCH_3$ | —$NH_2$ | —NH—$(CH_2CH_2OH)_3$ |
| 4-$CO_2$M | —H | 2-$OCH_2CO_2$M | 5-$OCH_3$ | —$NH_2$ | H |
| 4-$CO_2$M | —H | 2-$OCH_2CO_2$M | 5-$OCH_3$ | —$NH_2$ | Li |
| 4-$CO_2$M | —H | 2-$OCH_2CO_2$M | 5-$OCH_3$ | —$NH_2$ | Na |
| 4-$CO_2$M | —H | 2-$OCH_2CO_2$M | 5-$OCH_3$ | —$NH_2$ | K |
| 4-$CO_2$M | —H | 2-$OCH_2CO_2$M | 5-$OCH_3$ | —$NH_2$ | —NH[$CH_2CH_2$—$OCH_2CH_2$OH]$_3$ |
| 4-$CO_2$M | —H | 2-$OCH_2CO_2$M | 5-$OCH_3$ | 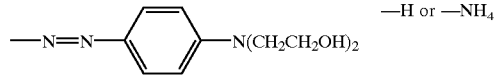 | —H or —$NH_4$ |
| 4-$CO_2$M | —H | 2-$OCH_2CO_2$M | 5-$OCH_3$ | 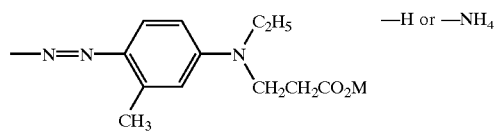 | —H or —$NH_4$ |

-continued

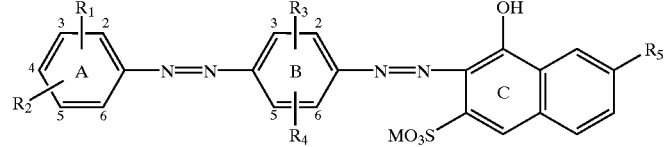

| R1 | R2 | R3 | R4 | R5 | M |
|---|---|---|---|---|---|
| 4-CO$_2$M | —H | 2-OCH$_2$CO$_2$M | 5-OCH$_3$ | 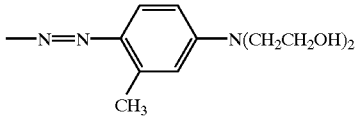 | —H or —NH$_4$ |
| 4-CO$_2$M | —H | 2-OCH$_2$CO$_2$M | 5-OCH$_3$ | 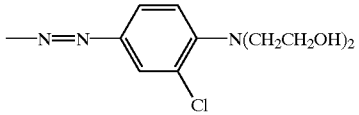 | —H or —NH$_4$ |
| 4-CO$_2$M | —H | 2-OCH$_2$CO$_2$M | 5-OCH$_3$ | 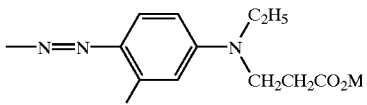 | —H or —NH$_4$ |
| 4-CO$_2$M | —H | 2-OCH$_2$CO$_2$M | 5-OCH$_3$ | 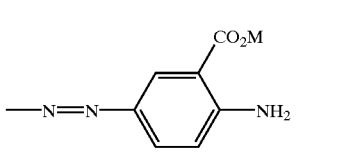 | —H or —NH$_4$ |
| 4-CO$_2$M | —H | 2-OCH$_2$CO$_2$M | 5-OCH$_3$ | 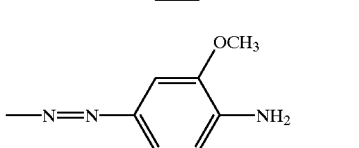 | —H or —NH$_4$ |
| 3-SO$_3$M | —H | 2-OCH$_2$CO$_2$M | 5-OCH$_3$ | —NH$_2$ | —H or —NH$_4$ |
| 4-CO$_2$M | —H | 2-OCH$_2$CO$_2$M | 5-OCH$_3$ | —NHCH$_3$ | —H or —NH$_4$ |
| 3-CO$_2$M | 5-CO$_2$M | 2-OCH$_2$CO$_2$M | 5-OCH$_3$ | —N—(CH$_2$CH$_2$OH)$_2$ | —H or —NH$_4$ |
| 4-CO$_2$M | 2-Cl | 2-OCH$_2$CO$_2$M | 5-CH$_3$ | —N—(CH$_2$CH$_2$OH)$_2$ | —H or —NH$_4$ |
| 5-CO$_2$M | 2-OCH$_3$ | 2-OCH$_2$CO$_2$M | 5-OCH$_3$ | —NHC$_4$H$_9$ | —H or —NH$_4$ |
| 4-CO$_2$M | —H | 2-OCH$_2$CO$_2$M | 5-OCH$_3$ | —N—(CH$_2$CH$_2$OH)$_2$ | —H or —NH$_4$ |
| 4-CO$_2$M | —H | 2-OCH$_2$CO$_2$M | 5-OCH$_3$ | —NHCH$_2$CH$_2$CO$_2$M | —H or —NH$_4$ |
| 4-SO$_3$M | —H | 2-OCH$_2$CO$_2$M | 5-OCH$_3$ | —NH$_2$ | —H or —NH$_4$ |
| 5-SO$_3$M | 2-Cl | 2-OCH$_2$CO$_2$M | 5-OCH$_3$ | —NH$_2$ | —H or —NH$_4$ |
| 4-CO$_2$M | —H | 2-OCH$_2$CO$_2$M | 5-OCH$_3$ | 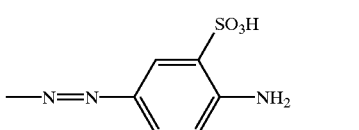 | —H or —NH$_4$ |
| 3-SO$_3$M | —H | 2-OCH$_2$CO$_2$M | 5-OCH$_3$ | 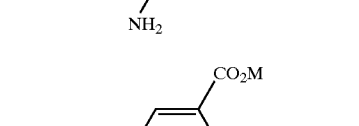 | —H or —NH$_4$ |
| 5-SO$_3$M | 2-OCH$_3$ | 2-OCH$_2$CO$_2$M | 5-OCH$_3$ | 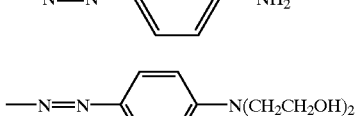 | —H or —NH$_4$ |

-continued

| R1 | R2 | R3 | R4 | R5 | (coupler) | M |
|---|---|---|---|---|---|---|
| 3-SO₃M | —H | 2-OCH₂CO₂M | | 5-OCH₃ | 2-amino-4-amino-5-sulfophenylazo group (SO₃H, NH₂, NH₂ substituted benzene) | —H or —NH₄ |
| 4-CO₂M | —H | 2-OCH₂CO₂M | | 5-OCH₃ | N-ethyl-N-(2-sulfoethyl)-3-methylaniline azo | —H or —NH₄ |
| 3-CO₂M | 6-CH₃ | 2-OCH₂CO₂M | | 5-OCH₃ | N-methyl-N-(2-sulfoethyl)aniline azo | —H or —NH₄ |
| 4-SO₃M | —H | 2-OCH₂CO₂M | | 5-OCH₃ | N,N-bis(2-hydroxyethyl)aniline azo | —H or —NH₄ |
| 3-SO₃M | —H | 2-OCH₂CO₂M | | 5-NH—CO—CO₂M | NH₂ | —H or —NH₄ |
| 3-CO₂M | 5-CO₂M | 2-OCH₂CO₂M | | 5-OCH₃ | (SO₃M, NH₂, NHCOCO₂M substituted benzene azo) | —H or —NH₄ |

$R_1$ at position 3, $R_2$ at position 5 on ring A; $R_3$ at position 3, $R_4$ at position 5 on ring B; ring C has OH, $R_5$, and $MO_3S$ substituents.

The compounds of this invention may be prepared by diazotizing an optionally and appropriately substituted aminobenzoic acid, an aminobenzenesulfonic acid, or an aminophthalic acid, coupling with an appropriately substituted aminophenoxyacetic, propionic or butyric acid or an appropriately substituted aminophenylacetic, 2-propionic or butyric acid, rediazotizing the resultant aminoazo intermediate compound, then coupling with an optionally substituted 6-amino-4-hydroxynaphthalene-2-sulfonic acid. If 6-amino-4-hydroxynaphthalene-2-sulfonic acid itself is employed, the disazo intermediate compound may be rediazotized and further coupled with, for example, an optionally substituted coupleable aromatic amine such as, for example, phenyldiethanolamine or dialkylaniline to produce the trisazo dye of Formula I as set forth above.

Examples of aminobenzoic or aninophthalic acids from which ring (A) (as annotated above) may be derived include: 2-, 3-, or 4-aminobenzoic acid, 3- or 4-aminophthalic acid, 4- or 5-aminoisophthalic acid, 2-aminoterephthalic acid, 2-amino-5-bromobenzoic acid, 2-amino-3-, 4-, or 5-chlorobenzoic acid, 3-amino-4-chlorobenzoic acid, 4-amino-2-chlorobenzoic acid, 5-amino-2-chlorobenzoic acid, 4-amino-5-chloro-2-methoxybenzoic acid, 2-amino-4- or 5-fluorobenzoic acid, 2-amino-5-iodobenzoic acid, 2-amino-3-methoxybenzoic acid, 3-amino-4-methoxybenzoic acid, 4-amino-3-methoxybenzoic acid, 2-amino-3-, 5-, or 6-methylbenzoic acid, 3-amino-2- or 4-methylbenzoic acid, 4-amino-3-methylbenzoic acid, 2-amino-4- or 5-nitrobenzoic acid, 4-amino-3-nitrobenzoic acid, 2-n-butoxy-4-aminobenzoic acid. Also aminobenzenesulfonic acids from which ring A can be derived include metanilic acid, sulfanilic acid, 4- or 6-chlorometanilic acid, anthranilic acid, sulfanilic acid, a toluidinesulfonic acid, or an anisidinesulfonic acid.

Suitable precursors to ring (B) include, for example, 2'-amino-4'-methoxy-phenoxyacetic acid, 2'-amino-4'-methylphenoxyacetic acid, 2'-amino-4'-methoxy-phenoxypropionic acid, 2'-amino-4'-methylphenoxypropionic acid, 2'-amino-4'-acetamidophenoxyacetic acid; 2'-amino-4'-propoxy-phenoxyacetic acid, 2'-amino-4'-butoxy-phenoxyacetic acid.

Examples of couplers which provide ring (C) include, for example, gamma acid, N-methyl-gamma acid, N-butyl-gamma acid, N,N-dimethyl-gamma acid, N-carboxymethyl-gamma acid, N,N-di(carboxymethyl)-gamma acid, N—(2-carboxyethyl)-gamma acid, and N,N-diethyl-gamma acid.

Suitable precursors for ring (D), i.e.,

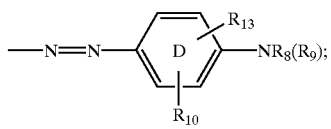

as the $R_5$ substituent include, for example, phenyldiethanolamine, m-tolyl-diethanolamine, 2',5'-dimethoxyphenyl-diethanolamine, N-phenylglycine, N-phenyl-3-aminopropionic acid, N,N-bis-(2-carboxyethyl)-m-toluidine, 2'-chloro-phenyl-diethanolamine, N,N-bis-(carboxymethyl)-aniline, anthranilic acid, and m-phenylenediamine sulfonic acid.

The compounds of this invention may be isolated readily from aqueous solution as the free acid at pH values below 5. They are quite soluble at alkaline pH in various salt forms including the alkali metal salts (lithium, sodium, potassium) and, especially, as the ammonium, alkanolamine and lower alkyl amine salts. The acid form is readily converted to any of the alkali metal, ammonium, or aliphatic or alkanolamine salts by simply adjusting the pH of an aqueous slurry of the free acid with the appropriate amine, alkali hydroxide or alkali carbonate. Residual undesired salts may be removed from the alkaline dye solutions by means of reverse osmosis.

The compounds of this invention, when applied as the ammonium or substituted ammonium salts by usual ink-jet printing methods, produce water-fast prints on paper because of their decreased water solubility at the lower pH values present on the surface of the paper, especially after removal of solvents and volatile amine by drying.

The dyes of the present invention are thus preferably present in a concentration of about 0.5 to 5 weight % in the ink jet composition, more preferably 1–4%. The dyes are dissolved in a water miscible solvent such as a $C_1$–$C_4$ alcohol, such as methanol, ethanol, n-propanol, isopropanol, n-butanol, s-butanol, t-butanol, or isobutanol; an amide such as N,N-dimethylformanide or dimethylacetamide; a ketone or ketone alcohol such as acetone or diacetone alcohol; an ether such as tetrohydrofuran or dioxane; an oligo- or poly alkylene glycol such as diethylene glycol, triethylene glycol, poly(ethylene glycol), or poly(propylene glycol) of MW up to about 500; an alkylene glycol or thioglycol such as ethylene glycol, propylene glycol, butylene glycol, 1,5-pentanediol or hexylene glycol; a thiodiglycol; a polyol such as gylcerol or 1,2,6-hexanetriol; a $C_1$–$C_4$ alkyl ether of a $C_2$–$C_4$ alkylene glycol or oligo-$C_2$–$C_4$ alkylene glycol such as 2-methoxyethanol, 2-(2-methoxy-ethoxy)ethanol, 2-(2-ethoxyethoxy)ethanol, 2-[2-(2-methoxyethoxy)ethoxy]ethanol, 2-[2-(2-ethoxy)ethoxy]ethanol or 2-[2-butoxyethoxy]ethanol; a heterocyclic amide such as 2-pyrrolidone, N-methyl-2-pyrrolidone or a sulfone such as sulpholane; or a mixture thereof.

Preferred water-miscible solvents include 2-pyrrolidone, N-methylpyrrolidone, sulpholane, ethylene glycol, diethylene glycol, triethylene glycol, and 2-methoxy-2-ethoxy-2-ethoxyethanol, 1,2-hexanediol, thiodiethanol, and poly (ethylene glycol) having weight average molecular weights of 200–1000.

The above water-miscible solvents aid in the solubility of the dye in the aqueous ink composition and tend to promote penetration of the dye into the substrate during the printing process. Further examples of such components can be found in U.S. Pat. Nos. 4,963,189; 4,704,113; 4,626,284; 5,891,230; 5,453,495; and 5,198,022, incorporated herein by reference.

The ink compositions may be applied to a substrate in an ink jet printing process. In this process, the ink is formed into small droplets by ejection from a reservoir through a small orifice so that the droplets are directed at a substrate. Such processes are referred to as piezoelectric ink jet printing or thermal ink jet printing. In thermal ink jet printing, programmed pulses of heat are applied to the ink by means of a resistor, adjacent to the onfice during relative movement between the substrate and the reservoir.

Preferred substrates for printing include projector slides; paper, which may have a neutral, acidic or basic character; and textile materials such as cotton, viscose, jute, hemp, flax, nylon and the like.

This invention is fiurther illustrated by the following examples in which all parts and percentages are by weight unless otherwise indicated.

EXPERIMENTAL SECTION

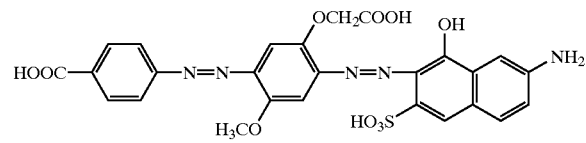

The dye depicted above is referred to in the following experiment as Dye #542. This dye is straight-forward to make and results in a dye suitable for ink jet printing. In an ink jet formulation it exhibits good color, optical density, light fastness and water fastness properties, good maintenance performance, and uniform drop formation resulting in good print quality.

The preferred formulation is show below.

| % by Weight | Ingredient | Function |
| --- | --- | --- |
| 2.5 | Dye 542 | Colorant |
| 0.1 | Chelating Agent | Metals control |
| 0.1 | Penetrant/Surfactant | Dry time reduction |
| 6.25 | Co-solvent | Humectant |
| 0.20 | Biocide | Bacteria control |
| 0.25 | Buffer | pH control |
| Balance | Water | Solvent/jetting agent |

Comparisons were made against the above formulation by substituting alternate colorants for Dye 542. The Pro-Jet® Fast Black 2 dye is the only colorant of the ones evaluated that came close to Dye 542. The dyes evaluated against Dye 542 include:

| Colorant | Supplier |
| --- | --- |
| Basacid Black X-38 | BASF |
| Duasyn Direct Black HEF-SF Liquid | Clariant Corporation |
| Pro-Jet [™] Fast Black 2 | Zeneca |
| Food Black 2 | Tricon Colors Incorporated |
| Bayscript Special Black SP Liquid | Bayer |
| Water Black 187-LM | Orient Chemical Industries |

Inks were made with each of the six colorants and tested on a Lexmark Execjet II. The properties evaluated include idling maintenance, continuous print performance, and uncapped start up after 24 and 72 hours. On several different papers the optical density, color values, water fastness and light fastness properties were compared.

Functional Testing Scoring

Idling maintenance—The printhead is idled for 30, 60, 90, 120, and 180 seconds and after each time period all of the nozzles are fired. The print sample is then scored by the number of missing or misdirected nozzles at each time and then totaled. The higher the number the worse the performance.

Continuous print performance—The printhead is fired for 1 million, then 2 million, and then 3 million fires. The print sample is then scored by the number of missing or misdirected nozzles after each test and then totaled. The higher the number the worse the performance.

Start up—The printhead remains undisturbed and uncapped for 24 hours and then again for 72 hours. After each time the head is tested to see how m any nozzles are firing at the top and bottom of the print sample. A score of 56—56 is perfect indicating that all 56 nozzles are firing at the top and bottom of the page.

Optical density (OD)—The optical density is measured on a solid block of print over six different plain papers and then averaged. The higher the number the better the OD.

Water fastness (WF)—An image is printed and allowed to dry for three hours. It is then soaked for 5 minutes in DI water. The delta (i.e., change) in optical density is reported before and after soaking the image. This was averaged on two different papers. The smaller the value the better the WF.

Light fastness (LF) The ΔE (ie., change) is reported before and after exposing an image to a Xenon lamp for 72 hours. This was averaged over three different papers including photo and coated papers. The smaller the value the better the LF.

The table below summarizes the results of the Dye 542 against alternate black dyes which are commercially available and registered worldwide.

After the table the remaining discussion is related to dye synthesis.

while adding ice as needed to maintain the low temperature. After stirring an additional 30 minutes with excess nitrous acid present, as shown by testing with starch-iodide test paper, the slight excess was removed by addition of a small amount of sulfamnic acid.

2'-Amino-4'-methoxyphenoxyacetic acid (19.7 g., 0.1 mole) was dissolved in about 400 mL water as the hydrochloride and ice added to 0–5° C. With good stirring the 4-aminobenzoic acid diazo solution was added in a thin stream. Coupling began at once and after 2 hours appeared to be complete. The monoazo product was filtered, and washed well on the filter with deionized water. The paste was redissolved in 250 mL water with 50% NaOH to pH<10. Sodium nitrite (7 g.) was added and dissolved. To the solution was then added rapidly with stirring 30 mL 37% hydrochloric acid. The slurry was allowed to stir at room temperature for 16 hours. The precipitated diazonium salt was filtered and the cake washed with 200 mL 2.5% HCl. The filter cake was slurried in water and ice at about 200 mL volume. Gamma acid monohydrate, 95% (270.8/mole) 30 g. was dissolved in 75 mL water and 18 g. ammonia. The solution was clarified with 2 g. filteraid to remove a small amount of impurities. To the filtrate was added 150 g. ice. The slurry of monoazo-diazonium salt was added with good stirring in a thin stream forming a deep black-colored solution. After stirring for 30 minutes, the coupling solution was treated with 25% (on volume basis) NaCl to precipitate the dye which was then filtered after stirring for 1 hour to allow the salt to dissolve completely. The cake was washed with 100 mL 25% salt solution, redissolved and again salted out and filtered to further purify the product. The dye was finally dissolved in deionized water at 400 mL volume, clarified with 1 g. Darco and 2 g. filteraid by filtration, and reprecipitated by acidification with acetic acid, dropping it in slowly with good stirring to pH 4.5, whereupon the product dye completely precipitated. It was filtered and washed with 100 mL 1% acetic acid, and dried. The black dye, when formulated into inks and applied to paper by

| Dye | Idling Maint. | Continuous Print Test | 24 Hour Start Up | 72 Hour Start Up | OD | WF | LF | Overall Functional Ranking |
|---|---|---|---|---|---|---|---|---|
| Dye 542 | 37 | 37 | 5–56 | 56–56 | 1.35 | 0.12 | 9 | 2 |
| Basacid Black X38 | 257 | 17 | 3–56 | 5–55 | 1.19 | 0.05 | 27 | 5 |
| Duasyn Direct Blk HEF-SF Liq. | 343 | 37 | 0–56 | 0–55 | 1.28 | 0.14 | 5 | 6 |
| Projet Fast Black 2 | 20 | 17 | 56–56 | 56–56 | 1.33 | 0.12 | 11 | 1 |
| Food Black 2 | 92 | 29 | 56–56 | 56–56 | 1.26 | 0.10 | 41 | 4 |
| Bayscript Special Blk SP Liq. Water | 4 | 17 | 56–56 | 56–56 | 1.17 | 0.09 | 29 | 3 |
| Black 187-LM | 184 | 104 | 53–56 | 0–56 | 1.25 | 0.43 | 19 | 7 |

EXAMPLE I

Preparation of Dye #542.

4-Amino-benzoic acid (13.7 g., 0.1 mole) was stirred in 50 mL water and 50 g. ice. Then 25 g. of 37% hydrochloric acid was added and farther ice to 0° C. With good stirring a solution of 7 g. sodium nitrite was slowly added as absorbed ink-jet printers, gave water-fast prints having good light fastness and excellent tinctorial value.

The 2'-amino-4'-methoxyphenoxyacetic acid used in the above synthesis was prepared from commercially available 2-nitro-4-methoxyphenol by reaction with ethyl chloroacetate, hydrolysis of the ester with sodium hydroxide, and catalytic reduction of the nitro group to the amine, all by usual procedures known to those skilled in the art.

We claim:

1. The compound of Formula (III)

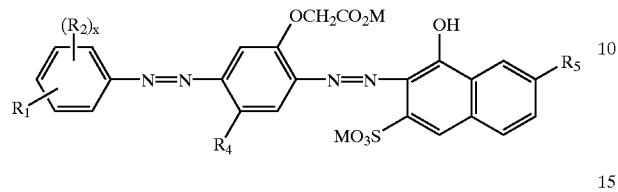

wherein:

$R_1$ is —$CO_2M$;

$R_2$ is —H, —$CO_2M$, -lower alkyl, -lower alkoxy, —$NO_2$, —$CF_3$, halogen, —NHCO-lower alkyl, —O—$(CH_2)_m$—$CO_2M$, or —$(CH_2)_n$—$CO_2M$;

x is 1 or 2;

$R_4$ is -lower alkyl, -lower alkoxy, —O—$(CH_2)_m$—$CO_2M$, or —$(CH_2)_n$—$CO_2M$;

$R_5$ is —N—$(R_6)(R_7)$, or a group of the formula

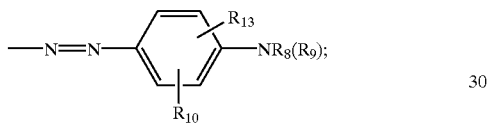

$R_6$ is —H, -lower alkyl, —$(CH_2)_n$—$CO_2M$, -lower hydroxyalkyl, or -lower cyanoalkyl;

$R_7$ is —H, -lower alkyl, —$(CH_2)_n$—$CO_2M$, -lower bydroxyalkyl; or -lower cyanoalkyl;

$R_8$ is —H, -lower alkyl, -lower hydroxyalkyl, or —$(CH_2)_n$ $CO_2M$;

$R_9$ is —H, -lower alkyl, -lower hydroxyalkyl, or —$(CH_2)_n$ $CO_2M$;

$R_{10}$ is —H, -lower alkyl, -lower alkoxy, -lower hydroxyalkyl, —$(CH_2)_n$—$CO_2M$, -halogen, —$NR_8R_9$, —$(CH_2)_nSO_3M$, or —O—$(CH_2)_mCO_2M$;

m is 1,2, or 3;

n is 1,2, or 3;

M is —H, —Li, —Na, —K, or —N—$(R_{11})_4$;

$R_{11}$ is —H, -lower alkyl, or —$(CH_2$—$CH(R_{12})$—O$)_p$—H;

p is 1 to 4;

$R_{12}$ is —H, —$CH_3$, —$CH_2$—$CH_3$, or —$CH_2$—OH; and $R_{13}$ is —H, -lower alkyl, -lower alkoxy, -halogen, —$CO_2M$, or —$SO_3M$.

2. The compound of claim 1, wherein $R_2$ is H.
3. The compound of claim 1, wherein $R_4$ is methoxy.
4. The compound of claim 1, wherein $R_5$ is —$NH_2$.
5. The compound of claim 2, wherein $R_5$ is —$NH_2$.
6. The compound of claim 1, wherein M is selected from the group consisting of —$NH_4$, —$N(CH_2CH_3)_4$, and —$NH(CH_2CH_2OH)_3$.

7. An ink composition comprising:

(a) at least 0.1% by weight of a compound of Formula III:

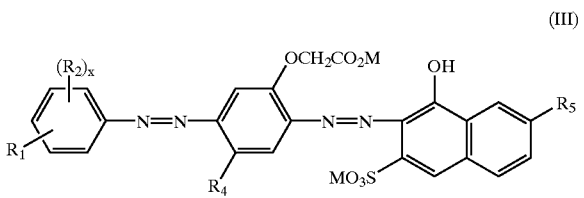

wherein:

$R_1$ is —$CO_2M$;

$R_2$ is —H, —$CO_2M$, -lower alkyl, -lower alkoxy, —$NO_2$, —$CF_3$, halogen, —NHCO-lower alkyl, —O—$(CH_2)_m$—$CO_2M$, or —$(CH_2)_n$—$CO_2M$;

x is 1 or 2;

$R_4$ is -lower alkyl, -lower alkoxy, —O—$(CH_2)_m$—$CO_2M$, or —$(CH_2)_n$—$CO_2M$;

$R_5$ is —N—$(R_6)(R_7)$, or a group of the formula

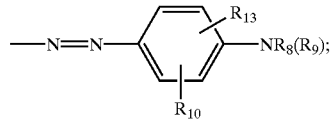

$R_6$ is —H, -lower alkyl, —$(CH_2)_n$—$CO_2M$, -lower hydroxyalkyl, or -lower cyanoalkyl;

$R_7$ is —H, -lower alkyl, —$(CH_2)_n$—$CO_2M$, -lower hydroxyalkyl; or -lower cyanoalkyl;

$R_8$ is —H, -lower alkyl, -lower hydroxyalkyl, or —$(CH_2)_nCO_2M$, $R_9$ is —H, -lower alkyl, -lower hydroxyalkyl, or —$(CH_2)_nCO_2M$;

$R_{10}$ is —H, -lower alkyl, -lower alkoxy, -lower hydroxyalkyl, —$(CH_2)_n$—$CO_2M$, -halogen, —$NR_8R_9$, —$(CH_2)_nSO_3M$, or —O—$(CH_2)_m$ $CO_2M$;.

m is 1,2, or 3;

n is 1,2, or 3;

M is —H, —Li, —Na, —K, or —N—$(R_{11})_4$;

$R_{11}$ is —H, -lower alkyl, or —$(CH_2$—$CH(R_{12})$—O$)_p$—H;

p is 1 to 4;

$R_{12}$ is —H, —$CH_3$, —$CH_2$—$CH_3$, or —$CH_2$—OH; and $R_{13}$ is —H, -lower alkyl, -lower alkoxy, -halogen, —$CO_2M$, or —$SO_3M$;

(b) water, and (c) at least one cosolvent.

8. The ink composition of claim 7, wherein $R_2$ is H amd $R_4$ is methoxy.

9. A substrate or medium coated with the ink composition of claim 7.

10. The medium of claim 9 wherein said medium is selected from paper, projector slides and textile materials.

* * * * *